United States Patent [19]

Bialous et al.

[11] 3,839,247

[45] Oct. 1, 1974

[54] WATER-CLEAR HYDROLYTICALLY STABLE POLYCARBONATE COMPOSITION CONTAINING AN AROMATIC OR ALIPHATIC EPOXY STABILIZER

[75] Inventors: Charles Andrew Bialous, Evansville; Gerald Fred Macke, Mt. Vernon, both of Ind.

[73] Assignee: General Electric Company, Pittsfield, Mass.

[22] Filed: Dec. 26, 1973

[21] Appl. No.: 427,832

Related U.S. Application Data

[63] Continuation-in-part of Ser. No. 321,268, Jan. 5, 1973, abandoned.

[52] U.S. Cl...... 260/18 PF, 260/18 EP, 260/18 TN, 260/30.4 R, 260/45.8 A, 260/47 XA
[51] Int. Cl............................................ C08g 51/58
[58] Field of Search........ 260/18 PF, 18 EP, 18 TN, 260/47 XA, 30.4 R, 45.8 A

[56] References Cited
UNITED STATES PATENTS
3,489,716  1/1970  Calkins.............................. 260/45.8
3,634,312  1/1972  Babbillis et al..................... 260/45.8

*Primary Examiner*—Donald E. Czaja
*Assistant Examiner*—Eugene Rzucidlo

[57] ABSTRACT

An improved water clear polycarbonate composition consisting in admixture an aromatic polycarbonate and a stabilizing amount of a particular epoxy compound which may be either an aromatic epoxy or an aliphatic epoxy compound and mixtures thereof.

5 Claims, No Drawings

WATER-CLEAR HYDROLYTICALLY STABLE POLYCARBONATE COMPOSITION CONTAINING AN AROMATIC OR ALIPHATIC EPOXY STABILIZER

This application is a continuation-in-part of U.S. Pat. application Ser. No. 321,268 filed Jan. 5, 1973, now abandoned.

This invention is directed to an improved clear polycarbonate composition which is resistant to hydrolysis and embrittlement when exposed to elevated temperatures and moisture. The improved polycarbonate composition of this invention is one which has in admixture with an aromatic polycarbonate a particular epoxy compound.

BACKGROUND OF THE INVENTION

Polycarbonate resins have found great usage in industry in preparing many plastic parts. Their increased usage has been due in part to the toughness of the aromatic polycarbonate. It has often been claimed as a virtually unbreakable plastic and has been used extensively to replace glass in glazing applications. Clear polycarbonates are also used for producing bottles which bottles are claimed to be virtually unbreakable. As such, the polycarbonates have found wide acceptance for bottle applications. In the bottle applications, clear polycarbonates are now used for molding baby bottles because of the obvious safety feature of being virtually unbreakable. Unfortunately, these clear baby bottles suffer from the drawbacks of becoming hazy and somewhat brittle after sterilization in water or moisture at elevated temperatures. When this occurs, it defeats the purpose for which the clear polycarbonate became attractive for use in molding baby bottles, namely, its unbreakable quality.

DESCRIPTION OF THE INVENTION

It has now been surprisingly discovered that the drawbacks of hazing and brittleness of clear polycarbonate bottles when subjected to water or moisture under elevated temperatures, can now be overcome by incorporating in admixture with the polycarbonate minor amounts of certain epoxy compounds. The resulting composition is found to have excellent resistant to hazing and brittleness when formed into clear bottles and subsequently subjected to elevated temperatures and moisture such as is employed in sterilization. Specifically, the epoxy compounds employed in the practice of this invention may be either aromatic epoxies or aliphatic epoxies. The aromatic epoxies may be either mono, di or poly epoxies. In addition the polycarbonate employed herein is a polycarbonate of a dihydric phenol. The amount of epoxy employed is a stabilizing amount and can vary from 0.01 to about 0.50 weight percent based on the weight of the polycarbonate.

In the art, there are several patents directed to using epoxies with polycarbonates. One such patent is U.S. Pat. No. 3,489,716, which specifically discloses employing with a polycarbonate a cycloaliphatic epoxy containing 1-2-cycloaliphatic rings. Another patent is U.S. Pat. No. 3,634,312, which discloses the use of a great host of epoxies that can be used with a copolycarbonate and specifically poly (bisphenol-A-carbonate-co-phosphite). The cycloaliphatic epoxies are not suitable in the practice of this invention since they do result in some haziness after steam autoclaving for periods of time. In addition, the phosphite containing copolycarbonates are not suitable since they also result in hazing of clear bottles after steam autoclaving for periods of time.

PREFERRED EMBODIMENT OF THE INVENTION

The following examples are set forth to illustrate more clearly the principle and practice of this invention to those skilled in the art. Unless otherwise specified, where parts or percents are mentioned they are parts or percents by weight.

EXAMPLE I

To a reactor fitted with a reflux condenser and mechanical agitator charge 100 parts of methylene chloride, 150 parts of 2,2-bis(4-hydroxphenyl) propane, 150 parts of calcium hydroxide, 3 parts of phenol and 0.018 parts of triethylamine. The slurry is stirred and phosgene is added at a rate of about 90 parts per hour. After 50 minutes, the phosgene addition is terminated. The polycarbonate in solid form is recovered by filtering and removal of any residual solvent. The product is dried over night at 125°C. The product is then fed to the extruder which is at a temperature of about 525°F. and pelletized.

EXAMPLE II

To the polymer prepared in Example I before pelletizing, 0.1 weight percent of bisphenol-A diglycidyl ether is blended therewith and the blend is then pelletized as in Example I.

EXAMPLE III

Example II is repeated except that 0.05 weight percent of glycidol is employed herein in place of the bisphenol-A diglycidyl ether.

EXAMPLE IV

Example II is repeated except that 0.2 weight percent of epoxidized soybean oil is employed herein in place of the bisphenol-A diglycidyl ether.

EXAMPLE V

Example II is repeated except that 0.1 weight percent of epoxidized polybutadiene is employed herein in place of the bisphenol-A diglycidyl ether.

EXAMPLE VI

Example II is repeated except that 0.025 weight percent of 1,2,3,4-diepoxybutane is employed herein in place of the bisphenol-A diglycidyl ether.

EXAMPLE VII

To a reactor fitted with a reflux condenser and mechanical agitator, charge 1100 parts of methylene chloride, 150 parts of 2,2-bis (4-hydroxyphenyl) propane, 150 parts of calcium hydroxide, 3 parts of phenol and 0.018 parts of triethylamine. The slurry is stirred and 0.075 parts of phosphorus trichloride is added based on the weight of 2,2-bis (4-hydroxyphenyl) propane. The phosgene addition is terminated after about 50 minutes.

The polymer is recovered as in Example I and is found to have an elemental phosphorus content of about 0.0035 weight percent of phosphorus as determined by Schoniger combustion described in Identification and Analysis of Plastics by Haslam and Willis, Iliffe Books, London 1965, page 8.

EXAMPLE VIII

To the polymer so prepared in Example VII, 0.1 weight percent of 3,4-epoxy-cyclohexylmethyl 3,4-epoxycyclohexane carboxylate is blended with the polymer before pelletizing and the blend is then pelletized as in Example I.

EXAMPLE IX

Each of the polymer compositions of Examples I-VIII are injection molded into test samples of about 3 inches by 2 inches by ⅛ inch thick at about 650°F. The samples are subjected to ASTM test method D1003 for determining light transmission on the samples before and after steam autoclaving at 260°F. The higher the percent light transmitted, the better is the clarity of the sample.

The results are as follows:

TABLE I

| Sample | % Light Transmission before Autoclaving | % Light Transmission after Autoclaving (Time in Hours) |
|---|---|---|
| I | 86.6 | 3.0 (10 hrs.) |
| II | 89.3 | 77.5 (10 hrs.) |
| III | 88.1 | 63.4 (10 hrs.) |
| IV | 85.5 | 80.2 (10 hrs.) |
| V | 87.9 | 78.2 (18 hrs.) |
| VI | 87.7 | 78.9 (16 hrs.) |
| VII | 89.8 | 20.0 (10 hrs.) |
| VIII | 87.7 | 55.8 (10 hrs.) |

EXAMPLE X

Each of the polymers of Examples I-VIII are measured for molecular weight degradation as caused by hydrolysis by measuring the intrinsic viscosity before and after steam autoclaving. The greater the difference the greater degradation of the polycarbonate. Intrinsic viscosity is measured in dioxane at 30°C. The results are as follows:

TABLE II

| Sample | Intrinsic Viscosity Before Autoclaving | Intrinsic Viscosity After Autoclaving |
|---|---|---|
| I | 0.545 | 0.479 |
| II | 0.544 | 0.531 |
| III | 0.570 | 0.550 |
| IV | 0.575 | 0.513 |
| V | 0.550 | 0.525 |
| VI | 0.554 | 0.521 |
| VII | 0.500 | 0.369 |
| VIII | 0.534 | 0.380 |

The instant invention is directed to a particular polycarbonate composition which has excellent hydrolytic stability and excellent resistance to embrittlement when exposed to elevated temperatures and moisture. The Examples clearly show the effect autoclaving has on the polycarbonate formed item with and without the particular epoxy additives of this invention.

The epoxy that can be employed herein is either an aromatic epoxy or an aliphatic epoxy. Of the aromatic epoxies that are employed, they can be either the aromatic glycidyl ether or the aromatic diglycidyl ethers containing 1 to 3 rings or they may be polyepoxides, i.e., aromatic polyglycidyl ethers containing 1 to 3 aromatic rings. Of the aliphatic epoxies, they may be best represented by the following formula:

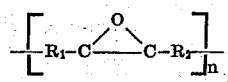

wherein $R_1$ and $R_2$ are independently selected from alkyl radicals of 1 to 24 carbon atoms and n is an integer of from 1 to about 10.

Specifically, the epoxies that can be employed herein are glycidol, bisphenol-A diglycidyl ether, tetrabromo bisphenol-A diglycidyl ether, diglycidyl ester of phthalic acid, diglycidyl ester of hexahydrophthalic acid, epoxidized soybean oil, butadiene diepoxide, tetraphenylethylene epoxide, octyl epoxy tallate and epoxidized polybutadiene. Preferably, the epoxy compound employed herein in the practice of this invention is bisphenol-A diglycidyl ether.

The dihydric phenols that can be employed herein to prepare the copolymer of this invention are bisphenols such as bis(4-hydroxyphenyl)-methane, 2,2-bis(4-hydroxyphenyl)-propane, 2,2-bis(4-hydroxy-3-methylphenyl)-propane, 4,4-bis(4-hydroxyphenyl)-heptane, 2,2-bis(4-hydroxy 3,5-dichlorophenyl)-propane, 2,2-bis(4-hydroxy 3,5-dibromophenyl)-propane, etc., dihydric phenol ethers such as bis(4-hydroxyphenyl)-ether, bis(3,5-dichloro-4-hydroxyphenyl)-ether, etc., dihydroxydiphenyls such as p,p'-dihydroxydiphenyl, 3,3'-dichloro-4,4'-dihydroxydiphenyl, etc., dihydroxyaryl sulfones such as bis(4-hydroxyphenyl)-sulfone, bis(3,5-dimethyl-4-hydroxyphenyl)-sulfone, etc., dihydroxy benzenes, resorcinol, hydroquinone, halo- and alkyl-substituted dihydroxy benzenes such as 1,4-dihydroxy-2-chlorobenzene, 1,4-dihydroxy-2,5-dichlorobenzene, 1,4-dihydroxy-3-methylbenzene, etc., and dihydroxy diphenyl sulfoxides such as bis(4-hydroxyphenyl)-sulfoxide, bis-(3,5-dibromo-4-hydroxyphenyl)-sulfoxide, etc. A variety of additional dihydric phenols are also available to provide carbonate polymers and are disclosed in U.S. Pat. Nos. 2,999,835, 3,028,365, and 3,153,008. It is of course possible to employ two or more different dihydric phenols or a copolymer of a dihydric phenol with glycol or with hydroxy or acid terminated polyester, or with a dibasic acid in the event a carbonate copolymer or interpolymer rather than a homopolymer is desired for use in the preparation of the aromatic carbonate polymers of this invention.

The carbonate precursors employed in the practice of this invention can be either a carbonyl halide or a bishaloformate. The carbonyl halides which can be employed herein are carbonyl chloride, carbonyl bromide and mixtures thereof. The bishaloformates suitable for use herein include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

As stated previously, the reaction may be carried out in the presence of an acid acceptor which may be either an organic or an inorganic compound. A suitable organic acid acceptor is a tertiary amine and includes such materials as pyridine, triethylamine, dimethylaniline, tributylamine, etc. The inorganic acid acceptor may be one which can either be an hydroxide, a carbonate, a bicarbonate or a phosphate of an alkali or alkaline earth metal.

The molecular weight regulators which are also employed in carrying out the process for preparing the aromatic polycarbonates resins can be such molecular weight regulators as phenol, cyclohexanol, methanol, paratertiarybutylphenol, para-bromophenol, etc. Preferably, phenol is employed as the molecular weight regulator.

It will thus be seen that the objects set forth above among those made apparent from the preceding description are efficiently attained, and since certain changes may be made in carrying out the above process and in the composition set forth without departing from the scope of this invention, it is intended that all matters contained in the above description shall be interpreted as illustrative and not in a limiting sense.

What is claimed is:

1. An improved water clear polycarbonate composition which is the reaction product of a dihydric phenol and carbonate precursor and which composition is resistant to hydrolysis when exposed to elevated temperatures and water, wherein the improvement comprises having in admixture with the polycarbonate a stabilizing amount of a particular epoxy compound based on the weight of the polycarbonate; said particular epoxy being selected from the group consisting of aromatic epoxies and aliphatic epoxies, and mixures thereof.

2. The composition of claim 1 wherein the aliphatic epoxy compound is represented by the following formula:

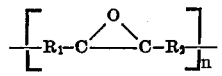

wherein $R_1$ and $R_2$ are independently selected from alkyl radical of 1 to 24 carbon atoms and n is an integer of from 1 to about 10.

3. The composition of claim 1 wherein the aromatic epoxy is selected from the group consisting of aromatic glycidyl ether, aromatic diglycidyl ether and aromatic polyglycidyl ether containing 1–3 aromatic rings.

4. The composition of claim 1 wherein the aliphatic epoxy is epoxidized soybean oil.

5. The composition of claim 1 wherein the aromatic epoxy is bisphenol-A diglycidyl ether.

* * * * *